US012155678B1

(12) United States Patent
Gaspard

(10) Patent No.: US 12,155,678 B1
(45) Date of Patent: *Nov. 26, 2024

(54) DETECTING AND MITIGATING LEAKED CLOUD AUTHORIZATION KEYS

(71) Applicant: SPLUNK INC., San Francisco, CA (US)

(72) Inventor: Camille Gaspard, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 359 days.

This patent is subject to a terminal disclaimer.

(21) Appl. No.: 17/526,893

(22) Filed: Nov. 15, 2021

Related U.S. Application Data

(63) Continuation of application No. 15/498,418, filed on Apr. 26, 2017, now Pat. No. 11,178,160.

(51) Int. Cl.
  *G06F 21/00* (2013.01)
  *H04L 9/40* (2022.01)
  *H04L 67/50* (2022.01)

(52) U.S. Cl.
  CPC .......... *H04L 63/1425* (2013.01); *H04L 63/10* (2013.01); *H04L 63/1441* (2013.01); *H04L 67/535* (2022.05)

(58) Field of Classification Search
  CPC ..... H04L 63/1425; H04L 67/10; H04L 63/10; H04L 63/1441; H04L 67/22; H04L 29/06911; H04L 29/06925; H04L 29/06931; H04L 29/06938; G06F 21/55
  See application file for complete search history.

(56) References Cited

U.S. PATENT DOCUMENTS

| 7,937,344 | B2 | 5/2011 | Baum et al. |
| 8,112,425 | B2 | 2/2012 | Baum et al. |
| 8,412,696 | B2 | 4/2013 | Zhang et al. |

(Continued)

OTHER PUBLICATIONS

Pivot Manual, Splunk Enterprise 6.1.3, Aug. 4, 2014, 30 pages.

(Continued)

*Primary Examiner* — Jeffrey C Pwu
*Assistant Examiner* — Helai Salehi
(74) *Attorney, Agent, or Firm* — Artegis Law Group, LLP

(57) ABSTRACT

In one embodiment, a discrepancy detection application automatically detects and addresses unauthorized activities associated with one or more authorization keys based on a request log and a provider log. The request log specifies activities that a client initiated, where the activities are associated with the authorization keys. The provider log specifies activities that a cloud provider performed, where the activities are associated with the authorization keys. In operation, the discrepancy detection application determines that one or more unauthorized activities have occurred based on comparing the request log to the provider log. The discrepancy detection application then performs an action that addresses the unauthorized activities. Advantageously, by detecting discrepancies between activities initiated by the client and activities performed by the cloud provider, the discrepancy detection application automatically detects any leaked authorization keys and minimizes resulting damages incurred by the client.

18 Claims, 5 Drawing Sheets

(56) References Cited

U.S. PATENT DOCUMENTS

| | | | |
|---|---|---|---|
| 8,589,375 | B2 | 11/2013 | Zhang et al. |
| 8,589,403 | B2 | 11/2013 | Marquardt et al. |
| 8,589,432 | B2 | 11/2013 | Zhang et al. |
| 8,682,925 | B1 | 3/2014 | Marquardt et al. |
| 8,738,587 | B1 | 5/2014 | Bitincka et al. |
| 8,738,629 | B1 | 5/2014 | Bitincka et al. |
| 8,751,529 | B2 | 6/2014 | Zhang et al. |
| 8,788,525 | B2 | 7/2014 | Neels et al. |
| 8,788,526 | B2 | 7/2014 | Neels et al. |
| 8,826,434 | B2 | 9/2014 | Merza |
| 8,983,994 | B2 | 3/2015 | Neels et al. |
| 9,124,612 | B2 | 9/2015 | Vasan et al. |
| 9,128,980 | B2 | 9/2015 | Neels et al. |
| 9,128,985 | B2 | 9/2015 | Marquardt et al. |
| 9,130,971 | B2 | 9/2015 | Vasan et al. |
| 9,173,801 | B2 | 11/2015 | Merza |
| 9,185,007 | B2 | 11/2015 | Fletcher et al. |
| 9,215,240 | B2 | 12/2015 | Merza et al. |
| 9,248,068 | B2 | 2/2016 | Merza |
| 9,286,413 | B1 | 3/2016 | Coates et al. |
| 9,419,992 | B2 * | 8/2016 | Ricafort ............... H04L 63/20 |
| 9,426,045 | B2 | 8/2016 | Fletcher et al. |
| 9,426,172 | B2 | 8/2016 | Merza |
| 9,432,396 | B2 | 8/2016 | Merza |
| 9,514,189 | B2 | 12/2016 | Bitincka et al. |
| 9,589,012 | B2 | 3/2017 | Neels et al. |
| 9,838,292 | B2 | 12/2017 | Polychronis |
| 10,127,258 | B2 | 11/2018 | Lamas et al. |
| 2013/0318236 | A1 | 11/2013 | Coates et al. |
| 2014/0140512 | A1 | 5/2014 | Hadley |
| 2014/0324862 | A1 | 10/2014 | Bingham et al. |
| 2014/0330815 | A1 | 11/2014 | Bitincka et al. |
| 2015/0019537 | A1 | 1/2015 | Neels et al. |
| 2015/0074409 | A1 * | 3/2015 | Reid ................... G06F 21/6218 713/171 |
| 2015/0106342 | A1 * | 4/2015 | Liang ................... G06F 12/0802 707/690 |
| 2016/0004750 | A1 | 1/2016 | Marquardt et al. |
| 2017/0223024 | A1 | 8/2017 | Desai et al. |
| 2018/0027006 | A1 * | 1/2018 | Zimmermann ..... H04L 63/0227 726/11 |
| 2018/0131688 | A1 | 5/2018 | Fang et al. |
| 2018/0288051 | A1 | 10/2018 | Hockings et al. |
| 2019/0068627 | A1 * | 2/2019 | Thampy ............. H04L 63/1425 |
| 2019/0098037 | A1 * | 3/2019 | Shenoy, Jr. ......... H04L 63/1441 |
| 2019/0098106 | A1 | 3/2019 | Mungel et al. |

OTHER PUBLICATIONS

Knowledge Manager Manual, Build a Data Model, Splunk Enterprise 6.1.3, Aug. 25, 2014, pp. 150-204.

Splunk Enterprise 8.0.0 Overview, available online, retrieved on May 20, 2020 from docs.splunk.com, 17 pages.

Splunk Cloud 8.0.2004 User Manual, available online, retrieved on May 20, 2020 from docs.splunk.com, 66 pages.

Splunk Quick Reference Guide, updated 2019, available online at https://www.splunk.com/pdfs/solution-guides/splunk-quick-reference-guide.pdf, retrieved on May 20, 2020, 6 pages.

Carraso, David, "Exploring Splunk," published by CITO Research, New York, NY, Apr. 2012, 156 pages.

Bitincka et al., "Optimizing Data Analysis with a Semi-structured Time Series Database," self-published, first presented at "Workshop on Managing Systems via Log Analysis and Machine Learning Techniques (SLAML)", Vancouver, British Columbia, Oct. 3, 2010, 9 pages.

* cited by examiner

DETECTING AND MITIGATING LEAKED CLOUD AUTHORIZATION KEYS

CROSS-REFERENCE TO RELATED APPLICATIONS

This application is a continuation of the co-pending U.S. patent application titled, "DETECTING AND MITIGATING LEAKED CLOUD AUTHORIZATION KEYS," filed on Apr. 26, 2017 and having Ser. No. 15/498,418. The subject matter of this related application is hereby incorporated herein by reference.

BACKGROUND OF THE INVENTION

Field of the Invention

Embodiments of the present invention relate generally to computer networks and, more specifically, to detecting and mitigating leaked cloud authorization keys.

Description of the Related Art

As is well-known, cloud providers charge for many cloud-related activities that the cloud providers perform for clients. A common example of a cloud-related activity is launching an instance that includes cloud provider resources (e.g., compute resources, memory resources, etc.). To charge the correct client for these types of activities, cloud providers implement authorization mechanisms between client applications and cloud provider application programming interfaces (APIs). In operation, client applications specify cloud authorization keys as part of initiating cloud-related activities via the cloud provider APIs. Each cloud authorization key identifies the client that is financially liable for the associated cloud-related activities. After verifying the cloud authorization keys, the cloud providers perform the specified cloud-related activities and charge the clients associated with the cloud authorization keys for the performed activities.

A common problem associated with cloud authorization keys is that leaked cloud authorization keys can result in unexpected charges attributable to malicious entities that conduct their own cloud-related activities associated with the leaked cloud authorization keys. As referred to herein, a "leaked" cloud authorization key is a cloud authorization key that is unintentionally exposed to any entity that is not authorized to use the cloud authorization key. As also referred to herein, an "unauthorized" use of a cloud authorization key occurs when an entity that is not authorized to use the cloud authorization key initiates "unauthorized" cloud-related activities associated with the cloud authorization key.

For example, if a client application includes a hard-coded cloud provider key and the client shares the source code for the client application via a public repository, then the cloud authorization key is leaked. After a cloud authorization key is leaked, the cloud provider cannot distinguish between authorized and unauthorized cloud-related activities associated with the cloud authorization key. As a result, before the client receives a bill from the cloud provider, malicious entities may use the cloud authorization key to perform unauthorized cloud-related activities that may result in tens or hundreds of thousands of dollars of unexpected charges to the client. Malicious entities may also use leaked authorization keys to access unauthorized data, such as the client's confidential data.

In an attempt to reduce unauthorized use of leaked cloud authorization keys, some clients enlist authorization key patrolling services. These types of services crawl the Web searching for any cloud authorization keys that belong to clients. However, one limitation of patrolling services is that patrolling services are only able to identify leaked cloud authorization keys that are published to the Web. If, on the other hand, a particular leaked cloud authorization key is not published to the Web, then the patrolling services are unable to detect that the cloud authorization key has been leaked. Another limitation of patrolling services is that the Web crawling operations are time consuming. In the time required to identify a leaked cloud authorization key, charges associated with unauthorized use of the leaked cloud authorization key may total tens of thousands of dollars, if not more, and confidential data may be exposed.

As the foregoing illustrates, what is needed in the art are more effective techniques for reducing unauthorized use of cloud authorization keys.

SUMMARY OF THE INVENTION

One embodiment of the present invention sets forth a method for detecting unauthorized activity associated with one or more authorization keys. The method includes comparing a request log to a provider log, where the request log includes activities initiated by a client associated with the one or more authorization keys, and the provider log includes activities performed by a cloud provider associated with the one or more authorization keys; determining that one or more unauthorized activities have occurred based on the comparing; and performing a first action to address the one or more unauthorized activities.

Further embodiments provide, among other things, a computer-readable medium and a system configured to implement the method set forth above.

One advantage of the disclosed techniques is that the techniques may automatically and comprehensively detect leaked authorization keys and minimize resulting damages incurred by the client. By contrast, patrolling services that detect leaked authorization keys are only able to identify leaked authorization keys that are published to the Web. Further, patrolling services typically require significantly more time to identify leaked authorization keys that are published to the Web than the disclosed techniques, during which resulting damages incurred by the client may dramatically increase.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
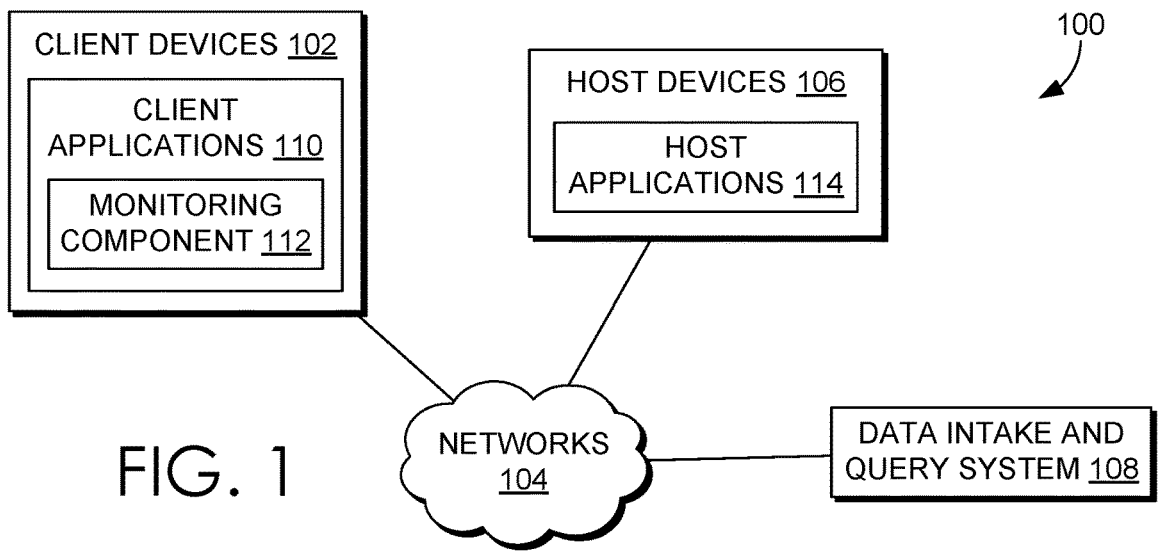
FIG. 1 illustrates a networked computer environment in which an embodiment may be implemented.

In the following description, numerous specific details are set forth to provide a more thorough understanding of the present invention. However, it will be apparent to one of skilled in the art that the present invention may be practiced without one or more of these specific details.

General Overview

Modern data centers and other computing environments can comprise anywhere from a few host computer systems to thousands of systems configured to process data, service requests from remote clients, and perform numerous other computational tasks. During operation, various components within these computing environments often generate significant volumes of machine-generated data. For example, machine data is generated by various components in the information technology (IT) environments, such as servers, sensors, routers, mobile devices, Internet of Things (IoT) devices, etc. Machine-generated data can include system logs, network packet data, sensor data, application program data, error logs, stack traces, system performance data, etc. In general, machine-generated data can also include performance data, diagnostic information, and many other types of data that can be analyzed to diagnose performance problems, monitor user interactions, and to derive other insights.

A number of tools are available to analyze machine data, that is, machine-generated data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, California. The SPLUNK® ENTERPRISE system is the leading platform for providing real-time operational intelligence that enables organizations to collect, index, and search machine-generated data from various websites, applications, servers, networks, and mobile devices that power their businesses. The SPLUNK® ENTERPRISE system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the SPLUNK® ENTERPRISE system, machine-generated data are collected and stored as "events". An event comprises a portion of the machine-generated data and is associated with a specific point in time. For example, events may be derived from "time series data," where the time series data comprises a sequence of data points (e.g., performance measurements from a computer system, etc.) that are associated with successive points in time. In general, each event can be associated with a timestamp that is derived from the raw data in the event, determined through interpolation between temporally proximate events having known timestamps, or determined based on other configurable rules for associating timestamps with events, etc.

In some instances, machine data can have a predefined format, where data items with specific data formats are stored at predefined locations in the data. For example, the machine data may include data stored as fields in a database table. In other instances, machine data may not have a predefined format, that is, the data is not at fixed, predefined locations, but the data does have repeatable patterns and is not random. This means that some machine data can comprise various data items of different data types and that may be stored at different locations within the data. For example, when the data source is an operating system log, an event can include one or more lines from the operating system log containing raw data that includes different types of performance and diagnostic information associated with a specific point in time.

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The data generated by such data sources can include, for example and without limitation, server log files, activity log files, configuration files, messages, network packet data, performance measurements, sensor measurements, etc.

The SPLUNK® ENTERPRISE system uses flexible schema to specify how to extract information from the event data. A flexible schema may be developed and redefined as needed. Note that a flexible schema may be applied to event data "on the fly," when it is needed (e.g., at search time, index time, ingestion time, etc.). When the schema is not applied to event data until search time it may be referred to as a "late-binding schema."

During operation, the SPLUNK® ENTERPRISE system starts with raw input data (e.g., one or more system logs, streams of network packet data, sensor data, application program data, error logs, stack traces, system performance data, etc.). The system divides this raw data into blocks (e.g., buckets of data, each associated with a specific time frame, etc.), and parses the raw data to produce timestamped events. The system stores the timestamped events in a data store. The system enables users to run queries against the stored data to, for example, retrieve events that meet criteria specified in a query, such as containing certain keywords or having specific values in defined fields. As used herein throughout, data that is part of an event is referred to as "event data". In this context, the term "field" refers to a location in the event data containing one or more values for a specific data item. As will be described in more detail herein, the fields are defined by extraction rules (e.g., regular expressions) that derive one or more values from the portion of raw machine data in each event that has a particular field specified by an extraction rule. The set of values so produced are semantically-related (such as IP address), even though the raw machine data in each event may be in different formats (e.g., semantically-related values may be in different positions in the events derived from different sources).

As noted above, the SPLUNK® ENTERPRISE system utilizes a late-binding schema to event data while performing queries on events. One aspect of a late-binding schema is applying "extraction rules" to event data to extract values for specific fields during search time. More specifically, the extraction rules for a field can include one or more instructions that specify how to extract a value for the field from the event data. An extraction rule can generally include any type of instruction for extracting values from data in events. In some cases, an extraction rule comprises a regular expression where a sequence of characters form a search pattern, in which case the rule is referred to as a "regex rule." The system applies the regex rule to the event data to extract values for associated fields in the event data by searching the event data for the sequence of characters defined in the regex rule.

In the SPLUNK® ENTERPRISE system, a field extractor may be configured to automatically generate extraction rules for certain field values in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the SPLUNK® ENTERPRISE system maintains the underlying raw data and uses late-binding schema for searching the raw data, it enables a user to continue investigating and learn valuable insights about the raw data.

In some embodiments, a common field name may be used to reference two or more fields containing equivalent data items, even though the fields may be associated with different types of events that possibly have different data formats and different extraction rules. By enabling a common field name to be used to identify equivalent fields from different types of events generated by disparate data sources, the system facilitates use of a "common information model" (CIM) across the disparate data sources (further discussed with respect to FIG. 5).

Operating Environment

FIG. 1 illustrates a networked computer system 100 in which an embodiment may be implemented. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In an embodiment, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine-generated data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

Client Devices

Client devices 102 of FIG. 1 represent any computing device capable of interacting with one or more host devices 106 via a network 104. Examples of client devices 102 may include, without limitation, smart phones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

Client Device Applications

In an embodiment, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In an embodiment, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In one embodiment, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some cases, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In an embodiment, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In an embodiment, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In an embodiment, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In an embodiment, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In an embodiment, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in the Figure) in which a value is stored. This field indicates a network latency measurement associated with one or more network requests. The data record may include a "state" field to store a value indicating a state of a network connection, and so forth for any number of aspects of collected performance data.

Data Server System

Figure 2:
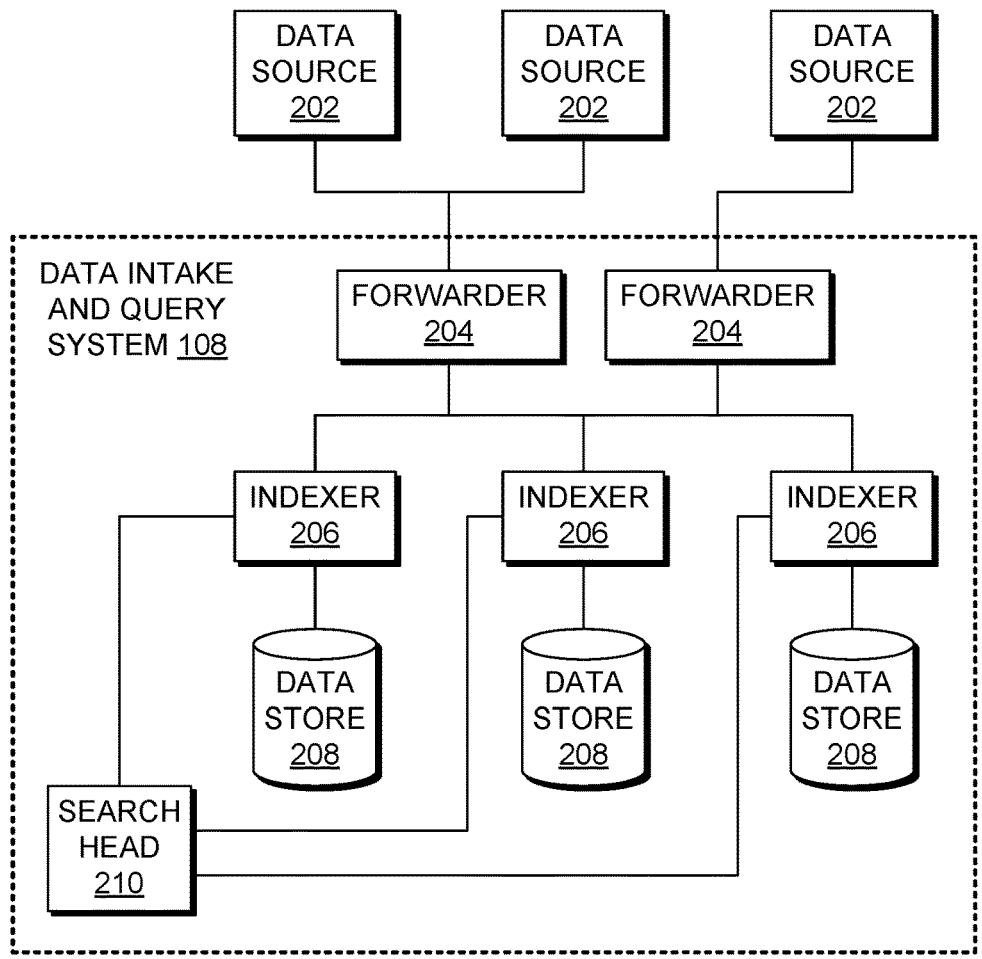
FIG. 2 illustrates a block diagram of an example data intake and query system in which an embodiment may be implemented.

FIG. 2 depicts a block diagram of an exemplary data intake and query system 108, similar to the SPLUNK® ENTERPRISE system. System 108 includes one or more forwarders 204 that receive data from a variety of input data sources 202, and one or more indexers 206 that process and store the data in one or more data stores 208. These forwarders and indexers can comprise separate computer systems, or may alternatively comprise separate processes executing on one or more computer systems.

Each data source 202 broadly represents a distinct source of data that can be consumed by a system 108. Examples of a data source 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In an embodiment, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally, or alternatively, a forwarder 204 may perform routing of events to indexers. Data store 208 may contain events derived from machine data from a variety of sources all pertaining to the same component in an IT environment, and this data may be produced by the machine in question or by other components in the IT environment.

Data Ingestion

Figure 3:
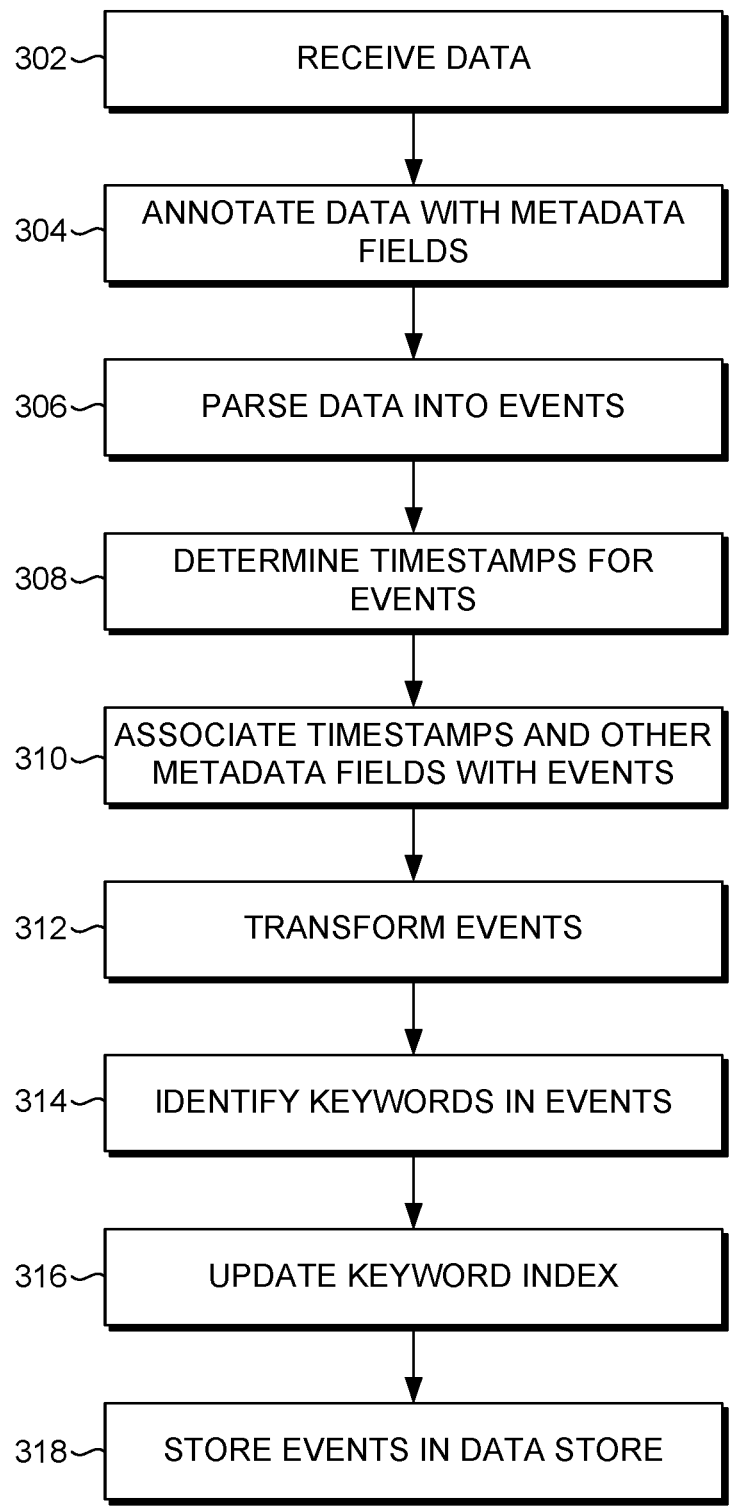
FIG. 3 is a flow diagram that illustrates how indexers process, index, and store data received from forwarders in accordance with the disclosed embodiments.

FIG. 3 depicts a flow chart illustrating an example data flow performed by Data Intake and Query system 108, in accordance with the disclosed embodiments. The data flow illustrated in FIG. 3 is provided for illustrative purposes only; those skilled in the art would understand that one or more of the steps of the processes illustrated in FIG. 3 may be removed or the ordering of the steps may be changed. Furthermore, for the purposes of illustrating a clear example, one or more particular system components are described in the context of performing various operations during each of the data flow stages. For example, a forwarder is described as receiving and processing data during an input phase; an indexer is described as parsing and indexing data during parsing and indexing phases; and a search head is described as performing a search query during a search phase. However, other system arrangements and distributions of the processing steps across system components may be used.

Input

At block 302, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In one embodiment, a forwarder receives the raw data and may segment the data stream into "blocks", or "buckets," possibly of a uniform data size, to facilitate subsequent processing steps.

At block 304, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In an embodiment, a forwarder forwards the annotated data blocks to another system component (typically an indexer) for further processing.

The SPLUNK® ENTERPRISE system allows forwarding of data from one SPLUNK® ENTERPRISE instance to another, or even to a third-party system. SPLUNK® ENTERPRISE system can employ different types of forwarders in a configuration.

In an embodiment, a forwarder may contain the essential components needed to forward data. It can gather data from a variety of inputs and forward the data to a SPLUNK® ENTERPRISE server for indexing and searching. It also can tag metadata (e.g., source, source type, host, etc.).

Additionally, or optionally, in an embodiment, a forwarder has the capabilities of the aforementioned forwarder as well as additional capabilities. The forwarder can parse data before forwarding the data (e.g., associate a time stamp with a portion of data and create an event, etc.) and can route data based on criteria such as source or type of event. It can also index data locally while forwarding the data to another indexer.

Parsing

At block 306, an indexer receives data blocks from a forwarder and parses the data to organize the data into events. In an embodiment, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries of events within the data. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, it can apply an inferred source type definition to the data to create the events.

At block 308, the indexer determines a timestamp for each event. Similar to the process for creating events, an indexer may again refer to a source type definition associated with the data to locate one or more properties that indicate instructions for determining a timestamp for each event. The properties may, for example, instruct an indexer to extract a time value from a portion of data in the event, to interpolate time values based on timestamps associated with temporally proximate events, to create a timestamp based on a time the event data was received or generated, to use the timestamp of a previous event, or use any other rules for determining timestamps.

At block 310, the indexer associates with each event one or more metadata fields including a field containing the timestamp (in some embodiments, a timestamp may be included in the metadata fields) determined for the event. These metadata fields may include a number of "default fields" that are associated with all events, and may also include one more custom fields as defined by a user. Similar to the metadata fields associated with the data blocks at block 304, the default metadata fields associated with each event may include a host, source, and source type field including or in addition to a field storing the timestamp.

At block 312, an indexer may optionally apply one or more transformations to data included in the events created at block 306. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to event data may, for example, be specified in one or more configuration files and referenced by one or more source type definitions.

Indexing

At blocks 314 and 316, an indexer can optionally generate a keyword index to facilitate fast keyword searching for event data. To build a keyword index, at block 314, the indexer identifies a set of keywords in each event. At block 316, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for name-value pairs found in events, where a name-value pair can include a pair of keywords connected by a symbol, such as an equals sign or colon. This way, events containing these name-value pairs can be quickly located. In some embodiments, fields can automatically be generated for some or all of the name-value pairs at the time of indexing. For example, if the string "dest=10.0.1.2" is found in an event, a field named "dest" may be created for the event, and assigned a value of "10.0.1.2".

At block 318, the indexer stores the events with an associated timestamp in a data store 208. Timestamps enable a user to search for events based on a time range. In one embodiment, the stored events are organized into "buckets," where each bucket stores events associated with a specific time range based on the timestamps associated with each event. This may not only improve time-based searching, but also allows for events with recent timestamps, which may have a higher likelihood of being accessed, to be stored in a faster memory to facilitate faster retrieval. For example, buckets containing the most recent events can be stored in flash memory rather than on a hard disk.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize data retrieval process by searching buckets corresponding to time ranges that are relevant to a query.

Moreover, events and buckets can also be replicated across different indexers and data stores to facilitate high availability and disaster recovery as described in U.S. patent application Ser. No. 14/266,812, entitled "Site-Based Search Affinity", filed on 30 Apr. 2014, and in U.S. patent application Ser. No. 14/266,817, entitled "Multi-Site Clustering", also filed on 30 Apr. 2014, each of which is hereby incorporated by reference in its entirety for all purposes.

Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 4:
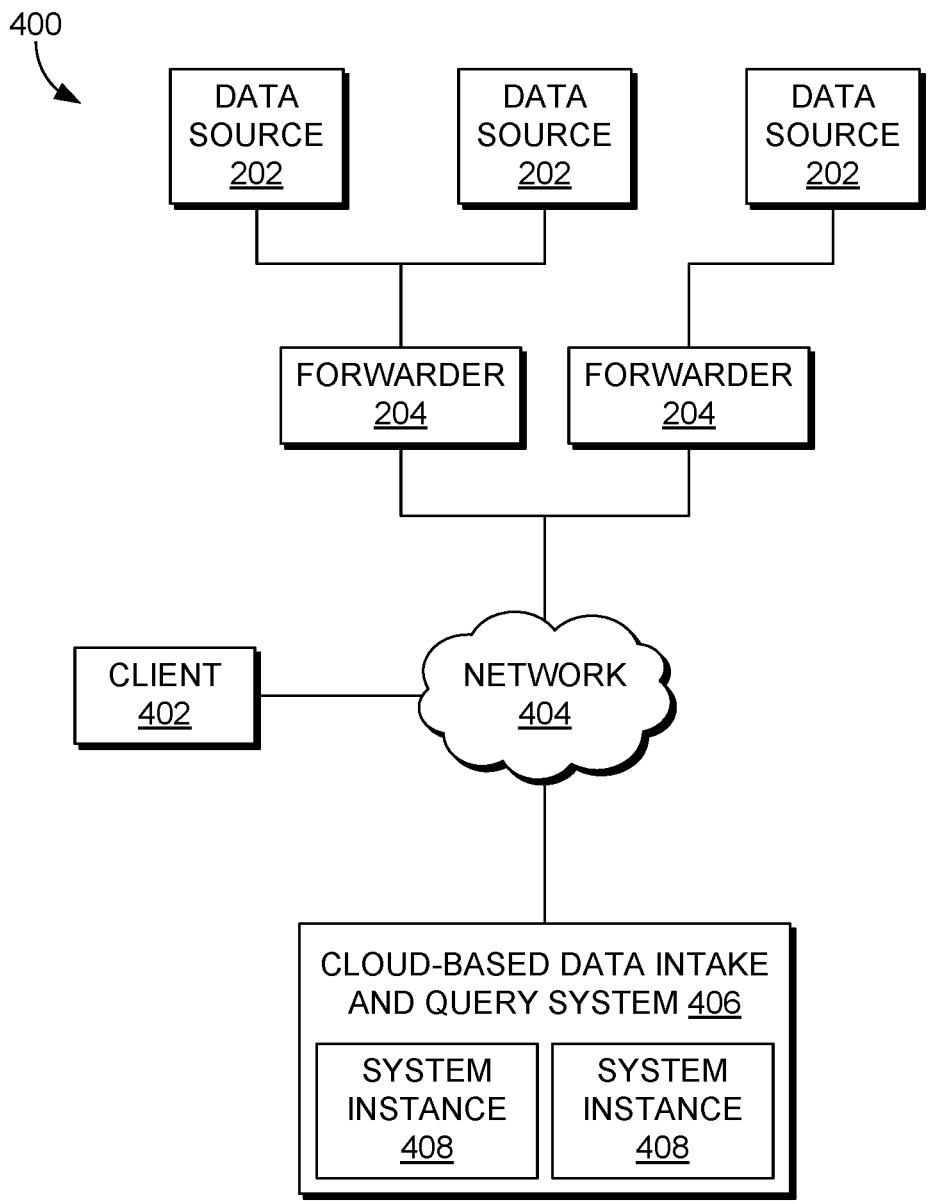
FIG. 4 illustrates a block diagram of an example cloud-based data intake and query system in which an embodiment may be implemented.

FIG. 4 illustrates a block diagram of an example cloud-based data intake and query system. Similar to the system of FIG. 2, the networked computer system 400 includes input data sources 202 and forwarders 204. These input data sources and forwarders may be in a subscriber's private computing environment. Alternatively, they might be directly managed by the service provider as part of the cloud service. In the example system 400, one or more forwarders 204 and client devices 402 are coupled to a cloud-based data intake and query system 406 via one or more networks 404. Network 404 broadly represents one or more LANs, WANs, cellular networks, intranetworks, internetworks, etc., using any of wired, wireless, terrestrial microwave, satellite links, etc., and may include the public Internet, and is used by client devices 402 and forwarders 204 to access the system 406. Similar to the system of 108, each of the forwarders 204 may be configured to receive data from an input source and to forward the data to other components of the system 406 for further processing.

In an embodiment, a cloud-based data intake and query system 406 may comprise a plurality of system instances 408. In general, each system instance 408 may include one or more computing resources managed by a provider of the cloud-based system 406 made available to a particular subscriber. The computing resources comprising a system instance 408 may, for example, include one or more servers or other devices configured to implement one or more forwarders, indexers, search heads, and other components of a data intake and query system, similar to system 108. As indicated above, a subscriber may use a web browser or other application of a client device 402 to access a web portal or other interface that enables the subscriber to configure an instance 408.

Providing a data intake and query system as described in reference to system 108 as a cloud-based service presents a number of challenges. Each of the components of a system 108 (e.g., forwarders, indexers and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 408) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment such as SPLUNK® ENTERPRISE and a cloud-based environment such as SPLUNK CLOUD™ are centrally visible).

Hybrid Cloud-Based System Overview

Figure 5:
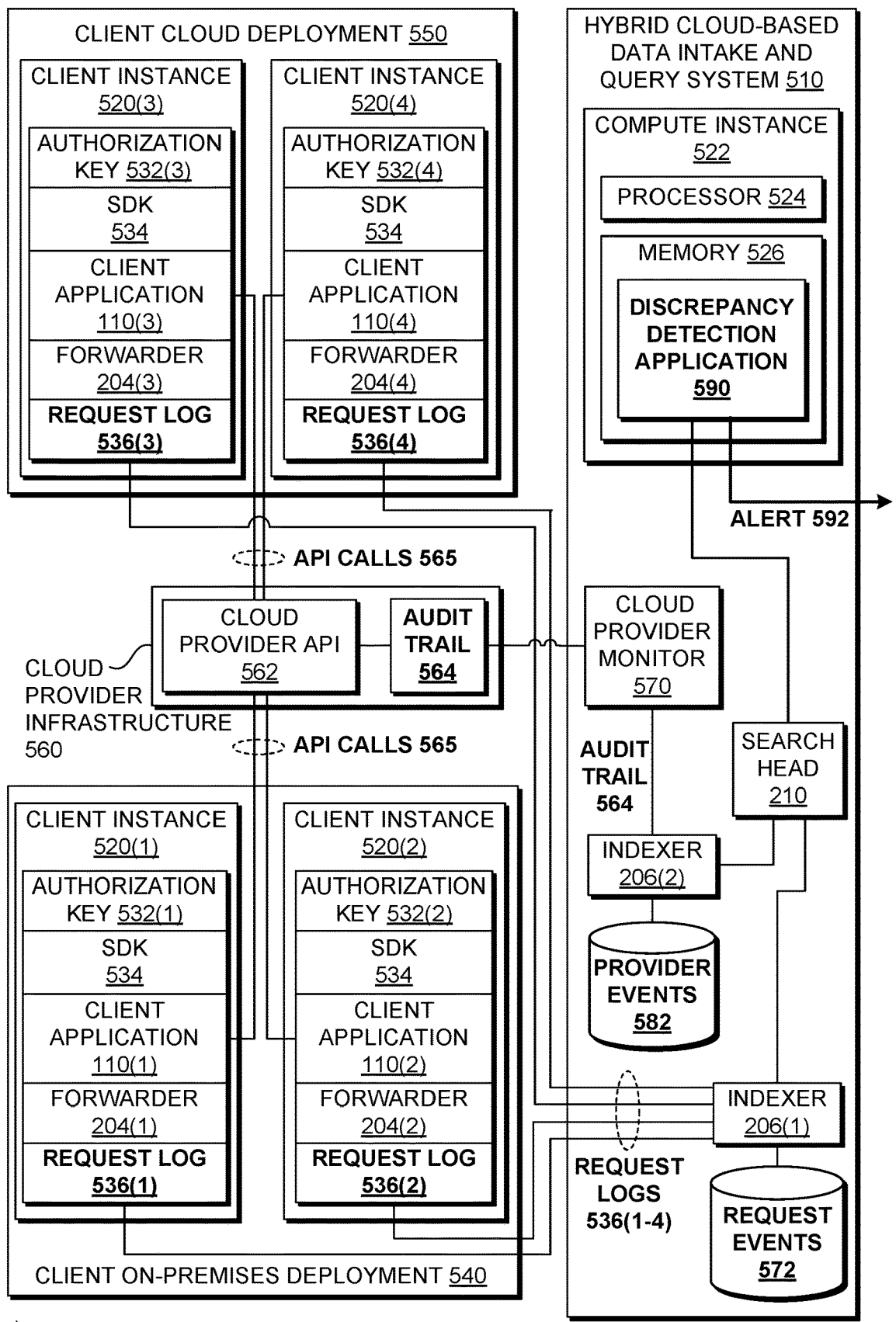
FIG. 5 illustrates a hybrid cloud-based computer system that is configured to reduce unauthorized activities associated with authorization keys in accordance with the disclosed embodiments.

FIG. 5 illustrates a hybrid cloud-based computer system 500 that is configured to reduce unauthorized activities associated with authorization keys 532 in accordance with the disclosed embodiments. As shown, the hybrid cloud-based computer system 500 includes, without limitation, a client on-premises deployment 540, a client cloud deployment 550, a cloud provider infrastructure 560, and a hybrid cloud-based data intake and query system 510. For explanatory purposes only, the hybrid cloud-based computer system 500 is associated with a single client that includes any number of users, and a single cloud provider that provides cloud services to the client. In alternate embodiments, the hybrid cloud-based data intake and query system 510 may be associated with any number of clients and any number of cloud providers. Also, for explanatory purposes, multiple instances of like objects are denoted with reference numbers identifying the object and parenthetical numbers identifying the instance, where needed.

The client on-premises deployment 540 comprises an arrangement of computing devices that is described in conjunction with FIG. 4 as an on-premises solution. That is, the on-premises deployment 540 is installed and operates on computing devices directly controlled by the client. For explanatory purposes, the on-premises deployment 540 includes, without limitation, two client instances 520(1) and 520(2). Each of the client instances 520(1) and 520(2) is implemented within one or more of the computing devices directly controlled by the user. In alternate embodiments, the client on-premises deployment 540 may include any number of the client instances 520.

By contrast, the client cloud deployment 550 includes one or more computing resources managed by the cloud provider and made available to the client as part of the cloud services. For explanatory purposes, the client cloud deployment 550 includes, without limitation, two client instances 520(3) and 520(4). Each of the client instances 520(3) and 520(4) is implemented via one or more computing resources managed by the cloud provider. In alternate embodiments, the client cloud deployment 550 may include any number of the client instances 520.

The cloud provider infrastructure 560 includes any number and type of computing resources managed by the cloud provider that are configured to manage cloud services. In general, the cloud provider infrastructure 560 provides cloud services to client instances 520 included in both the client on-premises deployment 540 and the client cloud deployment 550. The client on-premises deployment 540, the client cloud deployment 550, and the cloud provider infrastructure 560 may be interconnected in any technically feasible fashion via any number of networks. Each of the networks represent one or more LANs, WANs, cellular networks, intranetworks, internetworks, etc., in any combination, using any of wired, wireless, terrestrial microwave, satellite links, and so forth. In some embodiments, the networks include the public Internet.

The hybrid cloud-based data intake and query system 510 provides a data intake and query system as described in reference to system 108. However, the hybrid cloud-based data intake and query system 510 may be installed and operate on computing devices directly controlled by the client or may be implemented via one or more computing resources managed by the cloud provider. If the hybrid cloud-based data intake and query system 510 is implemented via one or more computing resources managed by the cloud provider, then the hybrid cloud-based data intake and query system 510 may comprise one of the system instances 408 described in conjunction with FIG. 4. As shown, the hybrid cloud-based data intake and query system 510 is configured to receive data from input sources that are located in the client on-premises deployment 540, the client cloud deployment 550, and the cloud provider infrastructure 560.

In alternate embodiments, the hybrid cloud-based computer system 500 may include any number (including zero) of the client on-premises deployment 540 and any number (including zero) of the client cloud deployments 550 in any combination. For instance, in some embodiments, the hybrid cloud-based computer system 500 does not include the client cloud deployment 550, and the hybrid cloud-based data intake and query system 510 is included in the client on-premises deployment 540.

Leaked Cloud Authorization Keys

As is well-known, cloud providers charge for many cloud-related activities that the cloud providers perform for clients. A common example of a cloud-related activity is launching an instance that includes cloud provider resources (e.g., compute resources, memory resources, etc.). To charge the correct client for these types of activities, cloud providers implement authorization mechanisms between the client applications 110 and cloud provider application programming interfaces (APIs) 562 included in the cloud provider infrastructure 560.

For each of the clients, as part of the authorization mechanisms, the cloud providers establish cloud authorization keys. Each of the cloud authorization keys identifies the client that is financially liable for the associated cloud-related activities. For example, "Amazon Web Services" (AWS™) establishes AWS™ access keys for each client, and the "Google Cloud Platform"™ service establishes application programming interface (API) keys for each client. Irrespective of the specific cloud provider, the one or more cloud authorization keys associated with the single client of the hybrid cloud-based computer system 500 are referred to herein as authorization keys 532. Each of the authorization keys 532 identifies that the client is financially liable for cloud-related activities associated with the authorization key 532.

As persons skilled in the art will recognize, one or more of the authorization keys 532 may be unintentionally exposed to an entity that is not authorized to use the cloud authorization key 532. These types of authorization keys 532 are referred to herein as "leaked" authorization keys 532. Subsequently, one or more malicious entities may conduct their own cloud-related activities associated with the leaked authorization keys 532. In general, as referred to herein, "unauthorized" use of the leaked authorization key 532 occurs when an entity that is not authorized to use the leaked authorization key 532 initiates "unauthorized" cloud-related activities associated with the leaked authorization key 532.

Because the cloud provider cannot distinguish between authorized and unauthorized cloud-related activities associated with leaked authorization keys 532, the cloud provider may charge the client for services performed for malicious entities in addition to services performed for the client. Before the client receives a bill from the cloud provider, malicious entities may use leaked authorization keys 532 to perform unauthorized cloud-related activities that may result in tens or hundreds of thousands of dollars of unexpected charges to the client. Malicious entities may also use leaked authorization keys 532 to access unauthorized data, such as the client's confidential data.

In conventional approaches to reducing the unauthorized use of leaked cloud authorization keys, some clients enlist authorization key patrolling services. These types of services crawl the Web searching for any cloud authorization keys that belong to clients. However, one limitation of patrolling services is that patrolling services are only able to identify leaked cloud authorization keys that are published to the Web. If a particular leaked cloud authorization key is not published to the Web, then the patrolling services are unable to detect that the cloud authorization key has been leaked. Another limitation of patrolling services is that the Web crawling operations are time consuming. In the time required to identify a leaked cloud authorization key, charges associated with unauthorized use of the leaked cloud authorization key may total tens of thousands of dollars, if not more, and confidential data may be exposed.

Automatically Detecting Leaked Authorization Keys

To comprehensively detect and minimize the negative impact of leaked authorization keys 532 on the client, the hybrid cloud-based data intake and query system 510 includes, without limitation, a discrepancy detection application 590. The discrepancy detection application 590 resides in a memory 526 of a compute instance 522 and executes on a processor 524 of the compute instance 522. The compute instance 522, the memory 526, and the processor 524 may be implemented in any technically feasible fashion based on any number and type of resources included in the hybrid cloud-based data intake and query system 510. For example, the compute instance 522 could be implemented in a cloud computing environment, a distributed computing environment, an on-premises server, a laptop, and so forth.

The processor 524 may be any instruction execution system, apparatus, or device capable of executing instructions. For example, the processor 524 could comprise a central processing unit (CPU), a graphics processing unit (GPU), a controller, a microcontroller, a state machine, or any combination thereof. The memory 526 stores content, such as software applications and data, for use by the processor 524. The memory 526 may be one or more of a readily available memory, such as random access memory (RAM), read only memory (ROM), floppy disk, hard disk, or any other form of digital storage, local or remote.

In some embodiments, a storage (not shown) may supplement or replace the memory 526. The storage may include any number and type of external memories that are accessible to the processor 524. For example, and without limitation, the storage may include a Secure Digital Card, an external Flash memory, a portable compact disc read-only memory (CD-ROM), an optical storage device, a magnetic storage device, cloud storage, other tangible storage media, or any suitable combination of the foregoing. In alternate embodiments, the memory 526 may not include the discrepancy detection application 590. Instead, the discrepancy detection application 590 may be provided as an application program (or programs) stored on computer readable media such as a CD-ROM, DVD-ROM, flash memory module, or other tangible storage media.

In general, the discrepancy detection application 590 compares cloud-related activities associated with the authorization keys 532 that are initiated by the client instances 520 to cloud-related activities associated with the authorization keys 532 that the cloud provider performs. The discrepancy detection application 590 then evaluates any discrepancies to determine whether unauthorized use of the authorization keys 532 has occurred. If the discrepancy detection application 590 determines that unauthorized use of the authorization keys 532 has occurred, then the discrepancy detection application 590 generates an alert 592. In alternate embodiments, in addition to or instead of generating the alert 592, the discrepancy detection application 590 may perform any number and type of other actions to address the unauthorized use of the authorization keys 532.

As shown, other components included in the hybrid cloud-based computer system 500 enable the discrepancy detection application 590 to detect authorized activities. In particular, the client instances 520 gather machine-generated data representing cloud-related activities associated with the authorization keys 532 that are initiated by the client instances 520. In a complementary fashion, a cloud provider monitor 570 included in the hybrid cloud-based data intake and query system 510 interacts with the cloud provider infrastructure 560 to gather machine-generated data representing cloud-related activities associated with the authorizations keys 532 that the cloud provider performs. The indexer 206(1) and the indexer 206(2) are configured to process the machine-generated data received from, respectively, the client instances 520 and the cloud provider monitor 570 to generate events. The discrepancy detection application 590 then accesses and searches the events via the search head 210.

More specifically, as shown, each of the client instances 520 includes, without limitation, one or more authorization keys 532, an instance of a software development kit (SDK) 534, one or more client applications 110, an instance of the forwarder 204, and a request log 536. The client applications 110 interface with the cloud provider API 562 via the SDK 534. Initially, each of the client applications 110 configures the SDK 534 to log their own requests to initiate cloud-related activities in the request log 536 included in the corresponding client instance 520. The client applications 110 may configure the SDK 534 to log requests in any technically feasible fashion and in any format that is consistent with the capabilities of the SDK 534. Subsequently, to initiate cloud-related activities, the client application 110 transmits a request to the SDK 534. The SDK 534 associates the request with one of the authorization keys 532 to generate a verifiable request. The SDK 534 then transmits the verifiable request to the cloud provider API 562 and logs the request in the corresponding request log 536.

Each of the forwarders 204 gathers machine-generated data included in the corresponding request log 536, and forwards the machine-generated data to the indexer 206(1) included in the hybrid cloud-based data intake and query system 510. For explanatory purposes only, each of forwarders 204 is depicted in FIG. 5 as forwarding the request log 536. However, as described in conjunction with FIG. 2, each of the forwarders 204 can also perform operations on the request log 536 before forwarding, including removing extraneous data, detecting timestamps in the data, parsing data, indexing data, routing data based on criteria relating to the data being routed, and/or performing other data transformations.

In alternate embodiments, the client instances 520 may not include instances of the SDK 534, and the client applications 110 may transmit requests directly to the cloud provider API 562. In such embodiments, the requests to the cloud provider API 562 may be logged in any technically feasible fashion. For example, in some alternate embodiments, the client applications 110 could log requests to the cloud provider API 562 in the request log 536. In other alternate embodiments, a firewall application could log requests from the client applications 110 to the cloud provider API 562.

In general, the hybrid cloud-based data intake and query system 510 may receive any number of request logs 536 from any number of forwarders 204. Any number (including zero) of the forwarders 204 may be located in any number of the client on-premises deployments 540 and any number (including zero) of the forwarders 240 may be located in any number of the client cloud deployments 550. In alternate embodiments the hybrid cloud-based data intake and query system 510 may receive any type of data that specifies client-related activities initiated by the client from any number of sources in any technically feasible fashion. For instance, in alternate embodiments, the hybrid cloud-based data intake and query system 510 may receive log files from firewall applications that are associated with the client instances 520.

As the indexer 206(1) receives the request logs 536 from the various client instances 520, the indexer 206(1) processes the request logs 536 to generate events and associated timestamps. The indexer 206(1) then indexes the events and stores the indexed events and the associated timestamps as requests events 572 (an instance of the data store 208). The request events 572 are also referred to herein as a "request log" that is a consolidation of the requests logs 536. In this fashion, the request events 572 represent the "authorized" cloud-related activities that are initiated by the client. FIG. 3 describes in detail an example of how the indexers 206 process, index, and store data received from the forwarders 204.

In a complementary fashion, the cloud provider monitor 570 initially configures the cloud provider API 562 to log cloud-related activities associated with the authorization keys 532 that the cloud provider performs in an audit trail 564. The cloud provider monitor 570 may configure the cloud provider API 562 in any technically feasible fashion and in any format that is consistent with the capabilities of the cloud provider API 562. Subsequently, when the cloud provider API 562 performs cloud-related activities in response to requests that are associated with any of the authorization keys 532, the client provider API 562 logs the cloud-related activities in the audit trail 564.

Periodically, the cloud provider monitor 570 requests the audit trail 564 from the cloud provider infrastructure 560. Upon receiving the audit trail 564, the indexer 206(2) included in the hybrid cloud-based data intake and query system 510 processes the audit trail 564 to generate events and associated timestamps. The indexer 206(2) then indexes the events and stores the indexed events and the associated timestamps as the provider events 582 (an instance of the data store 208). The provider events 582 are also referred to herein as a "provider log." In this fashion, the provider events 582 represent the cloud-related activities associated with the authorization keys 532 that are performed by the cloud provider. Notably, the provider events 582 include cloud-related activities initiated by the client in addition to any cloud-related activities initiated by any other entities using one or more leaked authorization keys 532.

While the hybrid cloud-based data intake and query system 510 continually generates and updates the request events 572 and the provider events 582, the discrepancy detection application 590 periodically compares the request events 572 to the provider events 582. More precisely, at the end of each of any number of sequential time windows of a predetermined time duration, the discrepancy detection application 590 compares the request events 572 that occurred during the time window to the provider events 582 that occurred during the time window. For example, suppose the predetermined time duration is ten seconds, and the discrepancy detection application 590 begins to execute at a time equal to zero seconds. After ten seconds, the discrepancy detection application 590 would compare the request events 572 that occurred between zero seconds and ten seconds to the provider events 582 that occurred between zero seconds and ten seconds. After twenty seconds, the discrepancy detection application 590 would compare the request events 572 that occurred between ten seconds and twenty seconds to the provider events 582 that occurred between ten seconds and twenty seconds, and so forth.

The discrepancy detection application 590 may be configured to implement the predetermined time duration in any technically feasible fashion. For example, the predetermined time duration could be specified via a graphical user interface (GUI). In general, the discrepancy detection application 590 may be configured to compare the request events 572 to the provider events 582 any number of times based on any number and types of events. For instance, in some alternate embodiments, the discrepancy detection application 590 may implement time windows of dynamically varying time duration. For example, the discrepancy detection application 590 could be configured to compare the request events 572 to the provider events 582 more frequently during specific times of day, or in response to an asynchronous GUI command. In another example, the discrepancy detection application 590 could vary the time duration based on the type and/or frequency of the provider events 582.

At the end of each time window, the discrepancy detection application 590 configures the search head 210 to return the subset of the requests events 572 and the subset of the provider events 582 that occurred within the time window. As shown, the search head 210 interfaces with the indexer 206(1) and the indexer 206(2) to access and search, respectively, the request events 572 and the provider events 582. The discrepancy detection application 590 then performs any number of normalization operations on the subset of the requests events 572 and the subset of the provider events 582 to generate, respectively, normalized request events 572 and normalized provider events 582.

In general, the normalization operations modify any of the normalized requests events 572 and any of the normalized provider events 582 that represent the same event to conform to a single standard. For example, the discrepancy detection application 590 could compare the timestamps associated with the subset of the request events 572 and the subset of the provider events 582. While performing the comparisons, the discrepancy detection application 590 could determine that the time stamp associated with a particular request event 572 is within a predetermined time interval of a particular provider event 582. The discrepancy detection application 590 would then update the timestamps of one or both of the request event 572 and the provider event 582 to a single value.

In another example, the discrepancy detection application 590 could identify any number of the subset of the requests events 572 and the subset of the provider events 582 as superfluous, and remove the identified events. In yet another example, the discrepancy detection application 590 could collapse multiple of the requests events 572 into a single request event 592 or collapse multiple of the provider events 582 into a single provider event 582. For example, a given cloud provider API 562 could generate a trio of provider events 582 for each request events 592, and the discrepancy detection application 590 could collapse each trio of provider events 582 into a single provider event 582.

Subsequently, the discrepancy detection application 590 compares the normalized request events 572 to the normalized provider events 582 to identify any symptomatic discrepancies. As referred to herein, a "symptomatic" discrepancy is indicative of unauthorized cloud-related activities. As part of comparing the normalized request events 572 to the normalized provider events 582, the discrepancy detection application 590 may perform any number of comparisons operations and/or other type of operations in any technically feasible fashion. For instance, in some embodiments, the discrepancy detection application 590 is configured to perform comparison operations that identify any normalized provider events 582 that do not appear to correspond to one of the normalized request events 572 as symptomatic discrepancies. In various embodiments, the discrepancy detection application 590 also identifies the particular authorization key(s) 532 associated with each symptomatic discrepancy or unauthorized activity.

In other embodiments, the discrepancy detection application 590 sets a client activity count equal to the total number of the normalized request events 572 and sets a provider activity count equal to the total number of the normalized provider events 582. The discrepancy detection application 590 then subtracts the client activity count from the provider activity count to determine an activity count discrepancy.

Importantly, the client activity count represents the total number of cloud-based activities associated with the authorization keys 532 that are initiated by the client instances 520. Equally importantly, the provider activity count represents the total number of cloud-based activities performed by the cloud provider that the cloud provider attributed to the client based on the authoritative keys 532. Consequently, if the activity count discrepancy is greater than zero, then the cloud provider likely performed activities that the client instances 520 did not request during the time window. For this reason, the discrepancy detection application 590 identifies an activity count discrepancy that is greater than zero as a symptomatic discrepancy that is indicative of unauthorized activities attributable to one or more leaked authorization keys 532.

In alternate embodiments, the discrepancy detection application 590 may determine whether an activity count discrepancy is a symptomatic discrepancy based on a predetermined tolerance. If the activity count discrepancy exceeds the predetermined tolerance, then the discrepancy detection application 590 identifies the activity count discrepancy as a symptomatic discrepancy. If the activity count discrepancy does not exceed the predetermined tolerance, then the discrepancy detection application 590 does not identify the activity count discrepancy as a symptomatic discrepancy.

The discrepancy detection application 590 may be configured to implement a predetermined tolerance in any technically feasible fashion. For example, the predetermined tolerance could be specified via a graphical user interface (GUI). Alternatively, since malicious entities typically initiate many unauthorized cloud-based activities in short periods of time, the predetermined tolerance may be hard-coded to a relative high number, such as one hundred.

After identifying any symptomatic discrepancies, the discrepancy detection application 590 identifies and removes any false positive discrepancies that are included in the symptomatic discrepancies. As referred to herein, a "false positive discrepancy" is any symptomatic discrepancy that is not, in fact, associated with unauthorized activities. The discrepancy detection application 590 may identify and remove false positive discrepancies in any technically feasible fashion. For instance, in some embodiments, the discrepancy detection application 590 compares the symptomatic discrepancies with a database of known false positive characteristics. The discrepancy detection application 590 identifies any symptomatic discrepancies that are characterized by the known false positive characteristics as false positive discrepancies. The discrepancy detection application 590 then removes any false positive discrepancies from the symptomatic discrepancies.

Finally, if there are any remaining symptomatic discrepancies, then the discrepancy detection application 590 generates the alert 592 that specifies the unauthorized activities indicated by the remaining symptomatic discrepancies. The discrepancy application 590 may generate any number of the alerts 592. Each of the alerts 592 may include any number and type of information. For example, each of the alerts 592 could include an activity count discrepancy, a list of the normalized provider events 582 that do not appear to correspond to one of the normalized request events 572, or any other information derived from the requests logs 536 or the audit trail 564.

Subsequently, the discrepancy detection application 590 may display any number of the alerts 592 via any number of display devices and/or transmit any number of the alerts 592 to any number of entities. For example, in some embodiments the discrepancy application 590 could generate the alert 592 that specifies the activity event discrepancy, display the alert 592 via the client instance 520(1), email the alert 592 to the cloud provider, and/or text the alert 592 to an employee of the client.

In the same or other embodiments, the discrepancy detection application 590 may directly or indirectly address unauthorized activities indicated by the remaining symptomatic discrepancies in any technically feasible fashion. Examples of how the discrepancy detection application 590 could address unauthorized activities include, without limitation:

disabling one or more of the one or more of the authorization keys 532
  deactivating one or more user accounts associated with the unauthorized activities and/or the authorization keys 532.
  causing a firewall application to perform one or more blocking operations
  causing a virtual private network server to perform one or more blocking operations
  deactivating a user account associated with the one or more unauthorized activities and/or the authorization keys 532.
  determining that the forwarder 204 is not installed on a particular client instance 110 and then installing the forwarder 204 on the client instance 110
  emailing a request to the cloud provider to provide hourly billing to track the costs associated with the leaked authorization keys 532
  isolating one or more of the client instances 110 or a user account in a walled-garden
  perform automated forensics (e.g., analyze network traffic) on a new instance that is launched by a malicious entity to determine the identity of the malicious entity
  generating an event associated with the hybrid cloud-based data intake and query system 510

Note that the techniques described herein are illustrative rather than restrictive, and may be altered without departing from the broader spirit and scope of the invention. Many modifications and variations on the functionality provided by the discrepancy detection application 590, the hybrid cloud-based data intake and query system 510, the cloud provider infrastructure 560, and the client instances 520 will be apparent to those of ordinary skill in the art without departing from the scope and spirit of the described embodiments.

In general, any number of the techniques may be implemented while other techniques may be omitted in any technically feasible fashion that enables the discrepancy detection application 590 to detect unauthorized cloud-related activities based on comparing data associated with the cloud-related activities. For example, in some embodiments, the client instances 520 do not include the forwarders 204 and the request logs 536. Instead, in some embodiments, one or more firewall applications included in the client on-premises deployment 540 and/or the client cloud deployment 550 may be configured to transmit data associated with cloud-related activities to the discrepancy detection application 590 or the hybrid cloud-based data intake and query system 510. In other embodiments, the cloud provider infrastructure 560 may be configured to transmit data associated with requests received from the client instances 520 to the discrepancy detection application 590 or the hybrid cloud-based data intake and query system 510.

Further, in some embodiments, the discrepancy detection application 590 may implement additional functionality. For example, in some embodiments, the discrepancy detection application 590 may include data intake and query functionality, and may operate independently of the hybrid cloud-based data intake and query system 510.

Automatically Reducing Unauthorized Activities

Figure 6:
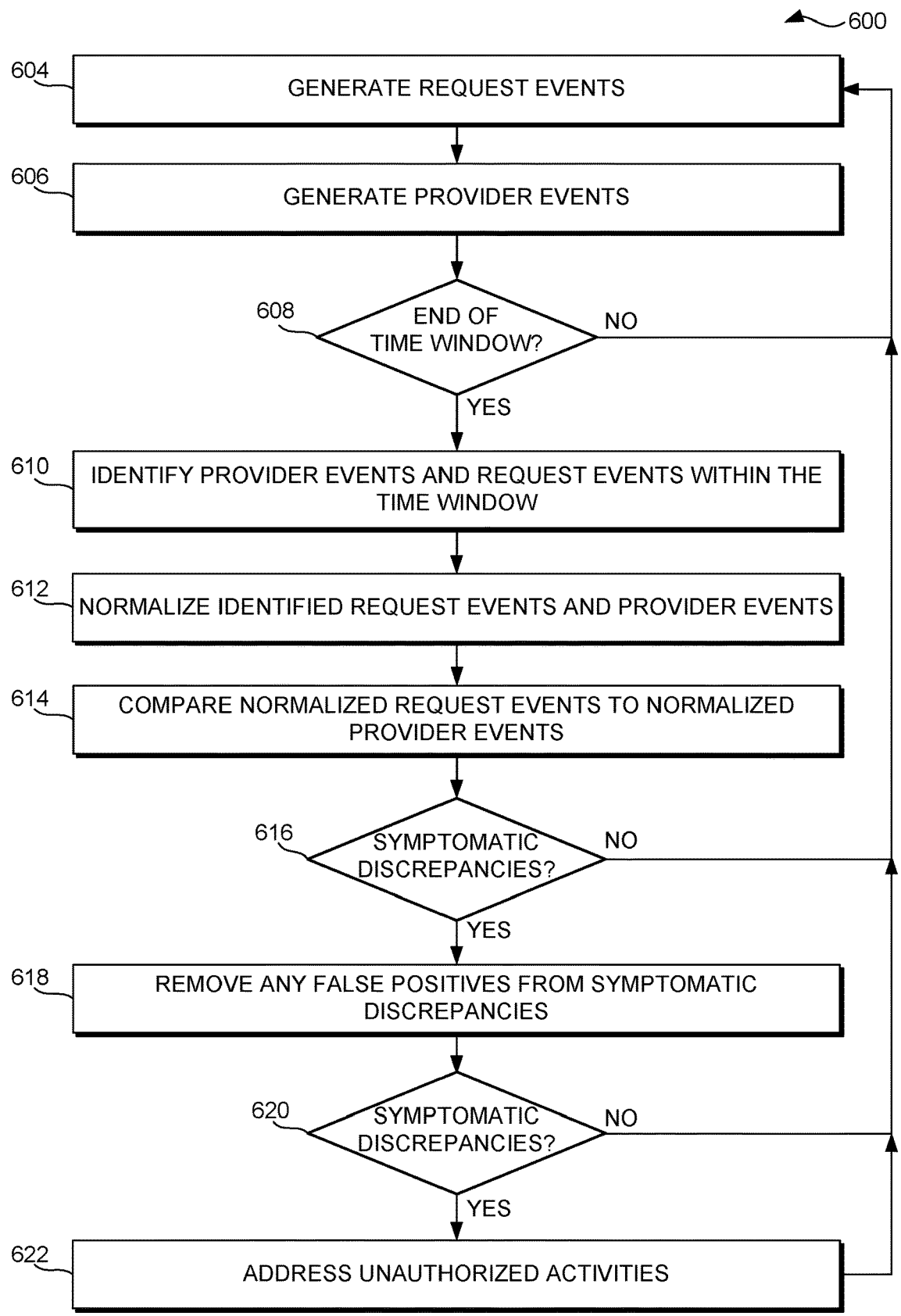
FIG. 6 is a flow diagram of method steps for reducing unauthorized activities associated with authorization keys in accordance with the disclosed embodiments.

FIG. 6 is a flow diagram of method steps for reducing unauthorized activities associated with authorization keys in accordance with the disclosed embodiments. Although the method steps are described with reference to the systems of FIGS. 1, 2, 4, and 5, persons skilled in the art will understand that any system configured to implement the method steps, in any order, falls within the scope of the present invention.

As shown, a method 600 begins at step 604, where the hybrid cloud-based data intake and query system 510 generates the request events 572 based on the request logs 536 received from the forwarders 204. Each of the forwarders 204 is included in a particular client instance 520 that is located in the client on-premises deployment 540 or the client cloud deployment 550. Each of the client instances 520 includes any number of client applications 110 that initiate cloud-related activities via the SDK 534.

As described in conjunction with FIG. 5, the SDK 534 associates each request to initiate cloud-related activities with one of the authorization keys 532 and transmits the resulting verifiable request to the cloud provider API 562. Further, the SDK 534 logs the request in the request log 536 associated with the corresponding client instance 520. The forwarders 204 gather cloud-related activity data included in the request logs 536 and forward the cloud-related activity data to the hybrid cloud-based data intake and query system 510.

Upon receiving the cloud-related activity data associated with the request logs 536, the indexer 206(1) included in the hybrid cloud-based data intake and query system 510 processes the cloud-related activity data to generate events and associated timestamps. The indexer 206(1) then indexes the events and stores the indexed events and the associated timestamps as the requests events 572 (an instance of the data store 208).

At step 606, the hybrid cloud-based data intake and query system 510 generates the provider events 582. Initially, the cloud provider monitor 570 configures the cloud provider API 562 to log all cloud-related activities that the cloud provider infrastructure 560 performs that are associated with the authorization keys 532 in the audit trail 564. Periodically, the cloud provider monitor 570 requests the audit trail 564 from the cloud provider infrastructure 560. Upon receiving the audit trail 564, the indexer 206(2) included in the hybrid cloud-based data intake and query system 510 processes the audit trail 564 to generate events and associated timestamps. The indexer 206(2) then indexes the events and stores the indexed events and the associated timestamps as the provider events 582 (an instance of the data store 208). Although steps 604 and 606 are depicted sequentially in the method 600, persons skilled in the art will understand that steps 604 and 606 are typically performed substantially in parallel.

At step 608, the discrepancy detection application 590 determines whether or not the current time corresponds to an end of a time window of a predetermined time duration. For example, if the predetermined time duration is one second, then the end of a first time window is at one second, the end of a second time window is at two seconds, and so forth. If, at step 608, the discrepancy detection application 590 determines that the current time does not correspond to the end of a time window, then the method 600 returns to step 604, where the hybrid cloud-based data intake and query system 510 continues to generate the request events 572 and the provider events 582.

If, however, at step 608, the discrepancy detection application 590 determines that the current time corresponds to the end of a time window, then the method 600 proceeds to step 610. At step 610, the discrepancy detection application 590 identifies the request events 572 and the provider events 582 that occurred within the time window via the search head 210 that interfaces with, respectively, the indexer 206(1) and the indexer 206(2). Notably, the identified request events 572 represent the cloud-related activities associated with the authorization keys 532 that the client instances 110 initiated during the time window. In a complementary fashion, the identified provider events 582 represent the cloud-related activities associated with the authorization keys 532 that the cloud provider infrastructure 560 performed during the time window.

At step 612, the discrepancy detection application 590 normalizes the identified request events 572 and the identified provider events 582 to generate, respectively, normalized request events 572 and normalized provider events 582. The discrepancy detection application 590 may perform any number and type of normalization operations on the identified request events 572 and the identified provider events 582 in any technically feasible fashion. In general, the normalization operations modify any normalized requests events 572 and any normalized provider events 582 that represent the same event to conform to a single standard.

At step 614, the discrepancy detection application 590 compares the normalized request events 572 to the normalized provider events 582 to identify symptomatic discrepancies. In general, symptomatic discrepancies indicate that the cloud-based activities initiated by the client do not match the cloud-based activities performed by the cloud provider that the cloud provider attributed to the client. In various embodiments, the discrepancy detection application 590 may perform any number of operations and implement any number and type of criteria to identify symptomatic discrepancy between the normalized request events 572 and the normalized provider events 582.

At step 616, the discrepancy detection application 590 determines whether there are any symptomatic discrepancies associated with the time window. If, at step 616, the discrepancy detection application 590 determines that no symptomatic discrepancies are associated with the time window, then the method 600 returns to step 604, where the hybrid cloud-based data intake and query system 510 generates and processes the request events 572 and the provider events 582 for a next time window.

If, however, at step 616, the discrepancy detection application 590 determines that there are symptomatic discrepancies associated with the time window, then the method 500 proceeds to step 618. At step 618, the discrepancy detection application 590 identifies and removes any false positive discrepancies that are included in the symptomatic discrepancies. The discrepancy detection application 590 may identify and remove false positive discrepancies in any technically feasible fashion.

For instance, in some embodiments, the discrepancy detection application 590 compares the symptomatic discrepancies with a database of known false positive characteristics. The discrepancy detection application 590 then removes any symptomatic discrepancies that are characterized by the known false positive characteristics. In the same or other embodiments, the discrepancy detection application 590 may receive feedback from an external source, such as the client, that identifies one or more of the symptomatic discrepancies as false positive discrepancies. The discrepancy detection application 590 then removes any of the symptomatic discrepancies that are identified as false positive discrepancies.

At step 620, the discrepancy detection application 590 determines whether there are any remaining symptomatic discrepancies that are associated with the time window. If, at step 620, the discrepancy detection application 590 determines that there are no remaining symptomatic discrepancies, then the method 600 returns to step 504, where the hybrid cloud-based data intake and query system 510 generates and processes the request events 572 and the provider events 582 for a next time window.

If, however, at step 620, the discrepancy detection application 590 determines that there are remaining symptomatic discrepancies, then the method 600 proceeds to step 622. At step 622, the discrepancy detection application 590 addresses unauthorized activities indicated by the remaining symptomatic discrepancies. The discrepancy detection application 590 may address unauthorized activities indicated by the remaining symptomatic discrepancies in any technically feasible fashion.

For example, the discrepancy detection application 590 could disable one or more of the one or more authorization keys 532, deactivate a user account associated with the one or more unauthorized activities, or cause a firewall application or a virtual private network server to perform one or more blocking operations. In another example, the discrepancy detection application 590 could determine that the forwarder 204 is not installed on a particular client instance 110, and install the forwarder 204 on the client instance 110. In yet another example, the discrepancy detection application 590 could alert the client and/or the cloud provider to the unauthorized activities via email, text message, display devices, etc. In a final example, the discrepancy detection application 590 may generate any number of events via the hybrid cloud-based intake and query system 510 to address the unauthorized activities.

The method 600 then returns to step 604, where the hybrid cloud-based data intake and query system 510 generates and processes the request events 572 and the provider events 582 for a next time window. In general, the hybrid cloud-based data intake and query system 510 continually generates and processes the request events 572 and the provider events 582 while the hybrid cloud-based data intake and query system 510 is operating. Further, as persons skilled in the art will recognize, the hybrid cloud-based data intake and query system 510 may perform various steps included in method 600 substantially in parallel.

In sum, the disclosed techniques may be implemented to automatically and efficiently address unauthorized use of cloud authorization keys. In operation, a discrepancy detection application is included in a hybrid cloud-based data intake and query system. The hybrid cloud-based data intake and query system is configured to continually collect machine-generated request logs and an audit trail. The request logs specify activities associated with the cloud authorization keys that were initiated by client instances included in both cloud deployments and on-premises deployments. The audit trail specifies activities associated with cloud authorization keys that the cloud provider performed. The hybrid cloud-based data intake and query system continually generates and indexes request events based on aggregated request logs and provider events based on the audit trail.

At the end of each of any number of predetermined time windows, the discrepancy detection application compares the request events that occurred during the time window to the provider events that occurred during the time window. The discrepancy detection application may perform any number and type of operations that reveal symptomatic discrepancies that are indicative of unauthorized activities. The discrepancy detection application then compares the symptomatic discrepancies with a database of known false positive characteristics. The discrepancy detection application removes any symptomatic discrepancies that are characterized by the known false positive characteristics. If any symptomatic discrepancies remain, then the discrepancy detection application generates an alert that unauthorized activities have occurred and/or performs one or more other remediation operations.

Advantageously, the discrepancy detection application can automatically and comprehensively detect unauthorized activities associated with the cloud authorization keys in a timely manner. In particular, unlike authorization key patrolling services, the discrepancy detection application automatically detects unauthorized activities associated with leaked cloud authorization keys irrespective of whether the leaked cloud authorization keys are published to the Web. Further, the client may configure the time interval that characterizes the time window to a relatively small time (e.g., 1 minute) to ensure that the discrepancy detection application reports any unauthorized activities within the small time after the unauthorized activities are performed. In this manner, the client may minimize unexpected charges billed to the client that are attributable to leaked cloud authorization keys.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors or gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method comprising:
    accessing, via a data intake and query system, a request log that includes a first plurality of activities initiated by a first client associated with one or more authorization keys;
    accessing, via the data intake and query system, a provider log that includes a second plurality of activities performed by a cloud provider;
    determining, based on accessing the request log, a first number of activities in the first plurality of activities that (i) occur within a first time period, and (ii) are initiated by the first client in association with one or more keys;
    determining, based on accessing the provider log, a second number of activities in the second plurality of activities performed by the cloud provider in response to receiving one or more requests associated with the one or more authorization keys, wherein the second number of activities attributed to the first client;
    collapsing two or more activities of the second number of activities into a first single event based on determining that a first application programming interface (API) configuration generates two or more activities of the second number of activities for each activity in the first number of activities;
    determining, based on comparing the first number of activities with the collapsed second number of activities, that a subset of the second plurality of activities is performed in response to one or more activities initiated by a second client that is different than the first client;
    determining, based on determining that the subset of the second plurality of activities is performed in response to the one or more activities that one or more unauthorized activities have occurred; and
    performing a first action to address the one or more unauthorized activities.

2. The computer-implemented method of claim 1, further comprising collapsing two or more activities of the first number of activities into a second single event.

3. The computer-implemented method of claim 1, wherein comparing the first number of activities and the second number of activities comprises:
    generating a difference value between the first number of activities and the second number of activities; and
    comparing the difference value with a tolerance threshold, wherein determining the subset of the second plurality of activities is further based on the difference value exceeding the tolerance threshold.

4. The computer-implemented method of claim 2, wherein collapsing the two or more activities of the first number of activities is based on a second API configuration associated with generating the first plurality of activities.

5. The computer-implemented method of claim 3, wherein the tolerance threshold is based on a rate of unauthorized activities occurring within a specified time range.

6. The computer-implemented method of claim 3, further comprising:
    determining, from the subset of the second plurality of activities, at least one activity as a false positive activity; and
    removing the at least one activity from the subset of the second plurality of activities.

7. The computer-implemented method of claim 6, wherein determining the at least one activity of as a false positive comprises:
    for each activity in the subset of the second plurality of activities, comparing a set of characteristics of an activity to at least one set of known false-positive characteristics; and
    determining that an activity is a false positive activity when the set of characteristics of the activity matches at least one of the sets of known false-positive characteristics.

8. The computer-implemented method of claim 6, wherein determining the at least one activity of as a false positive comprises, receiving an indication that the at least one activity as a false positive activity.

9. One or more non-transitory computer-readable media storing instructions that, when executed by one or more processors, cause the one or more processors to perform the steps of:
    accessing, via a data intake and query system, a request log that includes a first plurality of activities initiated by a first client associated with one or more authorization keys;
    accessing, via the data intake and query system, a provider log that includes a second plurality of activities performed by a cloud provider;
    determining a first number of activities in the first plurality of activities that are initiated by the first client in association with one or more keys;
    determining a second number of activities in the second plurality of activities performed by the cloud provider in response to receiving one or more requests associated with the one or more authorization keys;
    collapsing two or more activities of the second number of activities into a first single event based on determining that a first application programming interface (API) configuration generates two or more activities of the second number of activities for each activity in the first number of activities;
    determining that a subset of the second plurality of activities is performed in response to one or more activities initiated by a second client;
    determining that the subset of the second plurality of activities comprise one or more unauthorized activities have occurred; and
    performing a first action to address the one or more unauthorized activities.

10. The one or more non-transitory computer-readable media of claim 9, further storing instructions that, when executed by the one or more processors, cause the one or more processors to perform the steps of:
collapsing two or more activities of the first number of activities into a second single event.

11. The one or more non-transitory computer-readable media of claim 9, wherein comparing the first number of activities and the second number of activities comprises:
generating a difference value between the first number of activities and the second number of activities; and
comparing the difference value with a tolerance threshold, wherein determining the subset of the second plurality of activities is further based on the difference value exceeding the tolerance threshold.

12. The non-transitory one or more computer-readable media of claim 10, wherein:
collapsing the two or more activities of the first number of activities is based on a second API configuration associated with generating the first plurality of activities.

13. The one or more non-transitory computer-readable media of claim 11, further storing instructions that, when executed by the one or more processors, cause the one or more processors to perform the steps of:
determining, from the subset of the second plurality of activities, at least one activity as a false positive activity; and
removing the at least one activity from the subset of the second plurality of activities.

14. A system comprising:
memory storing a discrepancy detection application; and
a processor coupled to the memory that executes the discrepancy detection application by performing the steps of:
accessing a request log that includes a first plurality of activities initiated by a first client associated with one or more authorization keys;
accessing a provider log that includes a second plurality of activities performed by a cloud provider;
determining a first number of activities in the first plurality of activities that (i) occur within a first time period, and (ii) are initiated by the first client in association with one or more keys;
determining a second number of activities in the second plurality of activities performed by the cloud provider in response to receiving one or more requests associated with the one or more authorization keys;
collapsing two or more activities of the second number of activities into a first single event based on determining that a first application programming interface (API) configuration generates two or more activities of the second number of activities for each activity in the first number of activities;
determining, based on comparing the first number of activities with the collapsed second number of activities, that a subset of the second plurality of activities comprise one or more unauthorized activities; and
performing a first action to address the one or more unauthorized activities.

15. The system of claim 14, wherein the processors further executes the discrepancy detection application by performing the steps of:
collapsing two or more activities of the first number of activities into a second single event.

16. The system of claim 14, wherein comparing the first number of activities and the second number of activities comprises:
generating a difference value between the first number of activities and the second number of activities; and
comparing the difference value with a tolerance threshold, wherein determining the subset of the second plurality of activities is further based on the difference value exceeding the tolerance threshold.

17. The system of claim 14, wherein the processor further executes the discrepancy detection application by performing the steps of:
determining, from the subset of the second plurality of activities, at least one activity as a false positive activity; and
removing the at least one activity from the subset of the second plurality of activities.

18. The system of claim 15, wherein:
collapsing the two or more activities of the first number of activities is based on a second API configuration associated with generating the first plurality of activities.

* * * * *